United States Patent [19]

Vakharia

[11] Patent Number: 5,171,439
[45] Date of Patent: Dec. 15, 1992

[54] LIQUID NON-LEAKING GAS-VENTING SEAL FOR A CONTAINER CONTAINING LIQUID

[75] Inventor: Neville K. Vakharia, Wilmington, Del.

[73] Assignee: W. L. Gore & Associates, Inc., Newark, Del.

[21] Appl. No.: 726,478

[22] Filed: Jul. 8, 1991

[51] Int. Cl.⁵ .............................................. B01D 69/00
[52] U.S. Cl. ..................................... 210/172; 55/185; 210/436; 210/500.36

[58] Field of Search ............... 210/508, 436, 446, 507, 210/500.36, 490, 172; 55/159, 178, 185; 604/405, 406

[56] References Cited

U.S. PATENT DOCUMENTS 4,298,358 11/1981 Ruschke .......................... 210/436 X Primary Examiner—Frank Spear
Attorney, Agent, or Firm—Gary A. Samuels

[57] ABSTRACT

A gas-venting liquid non-leaking expanded polytetrafluoroethylene seal overlapping the periphery of an opening in a sheet substrate forming a container for strong electrolyte solutions.

7 Claims, 3 Drawing Sheets

5,171,439

LIQUID NON-LEAKING GAS-VENTING SEAL FOR A CONTAINER CONTAINING LIQUID

FIELD OF THE INVENTION

The invention pertains to non-leaking gas vents sealed onto container apertures, especially containers enclosing an aqueous electrolyte solution.

BACKGROUND OF THE INVENTION

It has become increasingly useful to enclose liquids in plastic containers to separate the liquids from supporting walls in order to utilize economical lightweight support materials which can be easily attacked by the liquids, but which otherwise have the strength or stiffness to support the weight of the liquid. Examples of such plastic containers include bag liners for metal or corregated paper containers, medical liquid liners used with or without support, or liners for holding supplies of liquid in space craft. One problem which often occurs in these uses is how to vent gases from the plastic containers or admit them into the containers where they may be used or consumed without attendant problems of sealing gas vents into the containers that will not leak the liquid around the seals which attach the vents to the containers or leak liquid from the vents themselves. The problems of leaking can become particularly severe where the liquids are strong electrolytes, such as aqueous caustic alkali solution, concentrated salt solutions, aqueous acids, or concentrated surfactant solutions. The plastic containers themselves can be manufactured to resist the electrolytes which may penetrate into the plastic to a small extent, but not cause the plastic to disintegrate for a long time. The plastic, such as polyethylene or polypropylene, may be layered with a support film of a different material, such as polyamide or polyester, which will support the polyolefin layer and aid in blocking attack by the electrolyte upon the polyolefin layers. The joint areas of a gas-venting seal attached to a container, however, may be degraded or rendered less effective by the electrolyte and generally tend to leak electrolytes outside the container. Although electrolytes are difficult to contain, the invention also has utility against other liquids.

SUMMARY OF THE INVENTION

The invention comprises a gas-venting seal overlapping the periphery of an opening in a sheet substrate. The seal comprises a sheet of hydrophobic polymer membrane bonded to a layer of porous textile support material, the hydrophobic polymer layer facing the opening in the substrate to be sealed. A preferred hydrophobic membrane is porous expanded polytetrafluoroethylene (PTFE) such as described in U.S. Pat. Nos. 3,953,566, 3,962,153, 4,096,227, 4,187,390, 4,902,423 or 4,478,665, which are hereby incorporated by reference. A band of sealant overlaps the periphery of the sheet of membrane and is fused to the textile support layer bonded to the membrane sheet and penetrates the pores of the textile support material and the porous membrane layer to adhere the sheets of membrane and support material to the substrate to be sealed. The preferred band of sealant material comprises a sheet of polyamide layered with and bonded to a polyolefin on at least one side. The polyolefin may be either polyethylene, polypropylene, or polybutylene and a polyester layer may be used instead of the polyamide layer. Other thermoplastic materials of adequate barrier properties may be used instead of a polyolefin. The textile support material bonded to the preferred porous expanded PTFE may be a non-woven or woven fabric or a fiber scrim or felt preferably made from the above polyolefin materials.

The container to be sealed may be in the form of a bag or a sheet subsequently sealed to a containing vessel to hold a strong aqueous electrolyte and may be of a material possessing adequate barrier properties.

DETAILED DESCRIPTION OF THE INVENTION

The hydrophobic preferably porous expanded PTFE membrane layer thus sealed in place over the opening of a bag form of container provides gas-venting from within the bag or may be utilized to admit a gas into the bag for participation as a reactant with materials held in the bag for that purpose. Such a vented bag could be used for a hydrogen battery, a fuel cell, to house electrolytes generated by a human body or for administration to a human body, such as urine bags or intravenous fluids, or other uses wherein the electrolyte resistance of the bag would be useful in controlling the corrosive properties of an electrolyte contained therein, where leakage of the contents of the bag could cause corrosion or other undesired problems.

Figure 1:
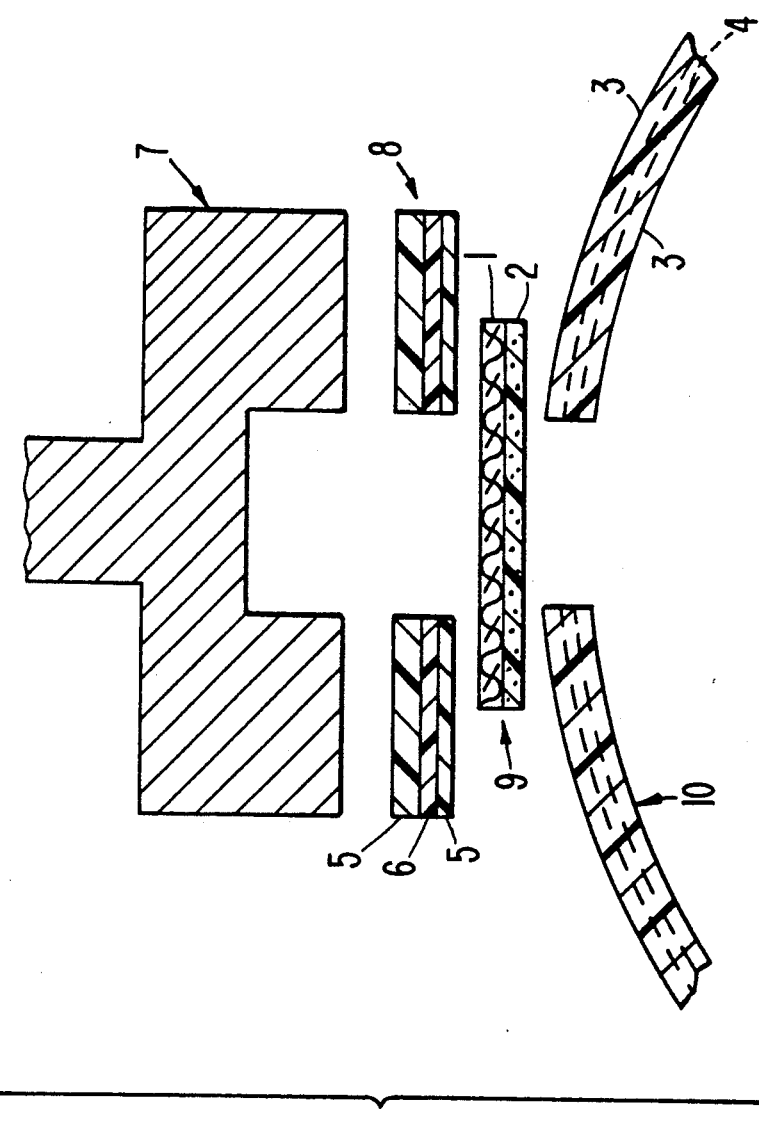
FIG. 1 is a schematic cross-section of a segment of a container having an opening covered by a porous gas-permeable membrane, a band of sealant spaced above the membrane and opening, and a means of melting the band of sealant under pressure.

The sealant band 8 is placed over the sheet of PTFE laminate 9 evenly spaced around the periphery of the opening in the bag wall 10 to overlap both the edges of laminate 9 and the walls 10 of the bag as shown in FIG. 1. PTFE laminate 9 comprises a layer of porous expanded PTFE 2 layered with a supporting layer 1 of textile fabric, felt, or scrim, the PTFE layer 2 being placed adjacent the outer layer of bag wall 10.

Figure 2:
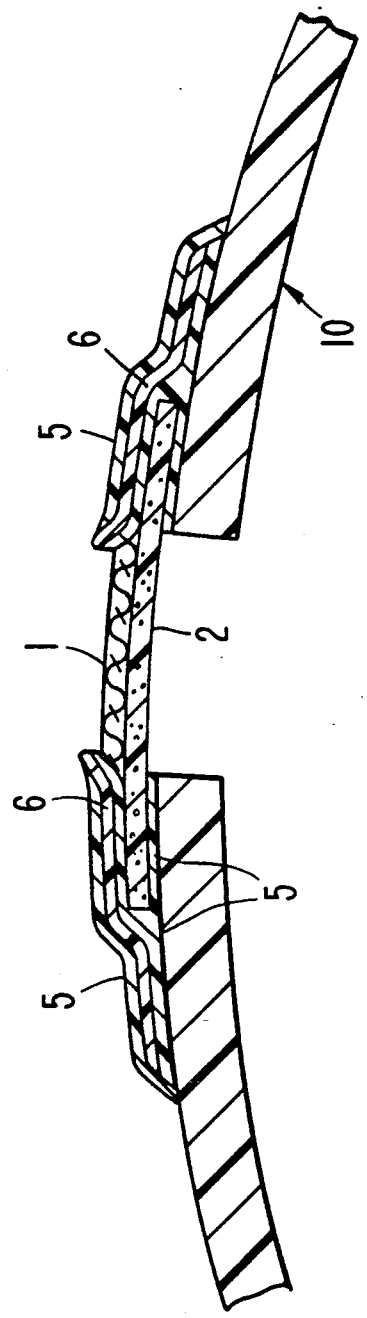
FIG. 2 is a cross-section of a completed seal of an opening in a substrate showing the layers in place as formed in the seal.

Sealant band 8 comprises a layer of polyamide 6 or other suitable supporting film which is layered on at least one side with polyolefin 5 film layers. Band 8 evenly overlaps laminate 9 to provide material to effect a good seal when the sealant is pressed onto the laminate and bag wall with adequate heating provided by heating head 7 to cause the polyolefin portion 5 of ring 8 to melt, flow into and through the pores of support layer 1 and expanded PTFE 2 and around the edge of laminate 9 to bond laminate 9 to the bag wall 10 and to bond the polyamide layer 6 to the bag wall 10 outside the laminate 9 as shown in FIG. 2. In place of a heating head may be used an ultrasonic, radio frequency, or other known sealing method. This procedure forms a thoroughly bonded seal of the gas-venting material (PTFE laminate 9) over the opening in the bag wall 10. Gases may freely pass through laminate 9 either into or out of the container of which wall 10 forms a part.

Figure 3:
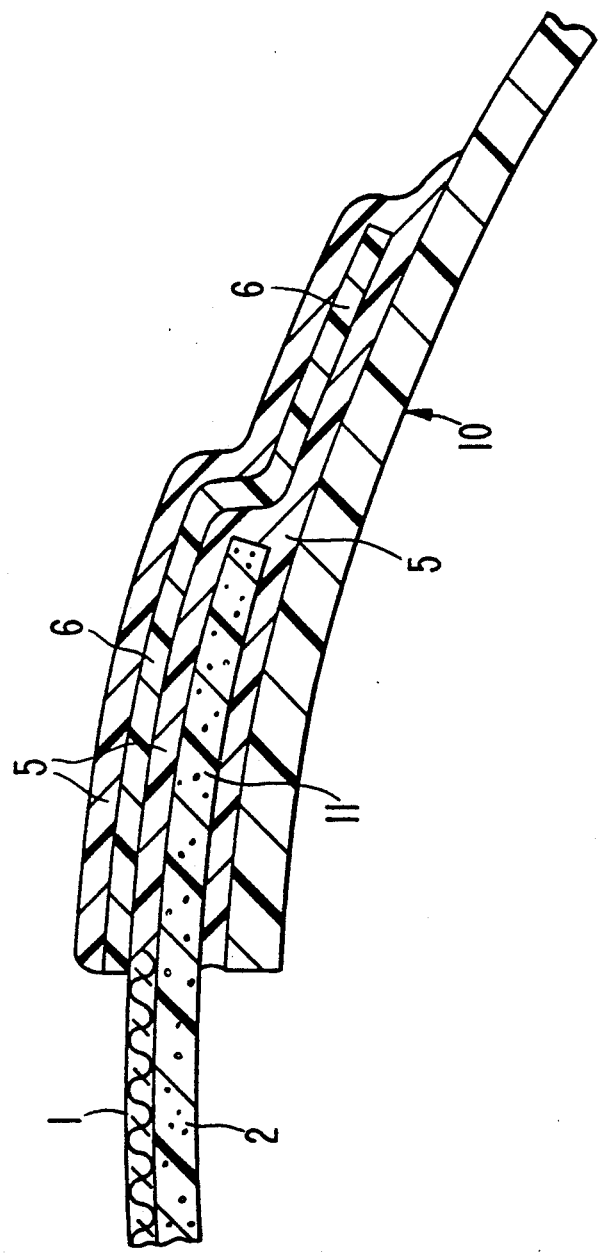
FIG. 3 is a broken cross-section of a segment of a sealed bag wall and opening in which the penetration of the thermoplastic of the sealant into and around the gas-permeable membrane is shown.

In FIG. 3, thermoplastic sealant layer 5, polyolefin for example, is shown interpenetrating expanded PTFE layer 2 and between layer 2 and bag wall 10 after layer 5 has been melted under pressure and forced into and around layers 2, 10, and polyamide layer 6. The portion of scrim 1 lying under sealant ring 8 may also melt and blend into melted layer 5 of the sealant material.

In FIG. 1, wall 10 is depicted as having an alternative polyamide support layer 4, as shown by the dotted lines therein, while that layer is absent in the bag 10 shown in FIG. 2. The preferable form of container will have a polyamide 4 support layer, but may have another support layer, such as polyester or polypropylene, for example. The container materials may include, besides the polyolefins, polyethylene, polypropylene, polybutylene, and polyethylene-propylene copolymers, other thermoplastic polymers such as polyvinyl chloride, ionomer resins, and ethylene-vinyl alcohol copolymers.

Support materials for the expanded PTFE layer 2 may include woven, non-woven fabrics, felts and scrims of materials such as the polyolefins listed above, polyvinyl chloride, polyamide, polyester, polyaramid, polyester/polyaramid, fluorinated ethylene-propylene copolymer, polyphenylene sulfide, full density or expanded PTFE, copolymers of ethylene and chlorotrifluoroethylene, and others, such as polyurethane foam, glass fibers or filter paper.

During the process of melting the polyolefin portion of the sealant band 8, the textile fiber or felt layer 1 covering and supporting the expanded PTFE layer 2, may also melt to form a part of the seal and aid the polyolefin material 5 in sealing the gas-venting PTFE 2 layer and the barrier and support layer 6 to substrate wall 10. The supporting layer may or may not melt during the melting and sealing process.

During the melting process, temperatures are kept low enough to retain the support layers 4 and 6 unmelted, but high enough to melt support layer 1 or to fill and seal it against gas or liquid leakage.

I claim:
1. A liquid non-leaking gas-venting seal overlapping the periphery of an opening in a flexible bag or sheet substrate comprising:
(a) a sheet of membrane comprising a layer of porous hydrophobic polymer bonded to a layer of porous textile support material, said hydrophobic polymer layer lying adjacent said substrate; and
(b) a band of sealant overlapping the periphery of said membrane sheet, said band of sealant being fused to said textile support material and to said substrate and penetrating the pores of said support material and membrane to adhere said sheet of membrane and support material to said substrate;
(c) said sealant band comprising a sheet of thermoplastic film material layered with a sheet of support material on at least one side.

2. A seal of claim 1, wherein said hydrophobic membrane comprises porous expanded polytetrafluoroethylene.

3. A seal of claim 1 wherein said thermoplastic material is polyolefin.

4. A seal of claim 1 wherein said support material is selected from the group consisting of polyamide, polyester, and polypropylene.

5. A seal of claim 1, wherein said polyolefin material is polyethylene, polypropylene, or polybutylene.

6. A seal of claim 1, wherein said textile support material is selected from the group consisting of woven fabric, non-woven fabric, fiber felt, and fiber scrim.

7. A seal of claim 6 wherein said textile support material is selected from the group consisting of polyamide, polyester, polyvinyl chloride, polyaramid, polyester/polyaramid, fluorinated ethylene-propylene copolymer, polyphenylene sulfide, full-density or expanded polytetrafluoroethylene, polyurethane foam, glass fibers, and filter paper.

* * * * *